(12) United States Patent
Marcos Izquierdo et al.

(10) Patent No.: US 12,072,016 B2
(45) Date of Patent: Aug. 27, 2024

(54) GUTTER FOR RECOVERING LUBRICATION OIL FOR A MECHANICAL REDUCER

(71) Applicant: SAFRAN TRANSMISSION SYSTEMS, Colombes (FR)

(72) Inventors: Juan-Luis Marcos Izquierdo, Moissy-Cramayel (FR); Mohamed Bouyakoub, Moissy-Cramayel (FR); Jordane Emile André Peltier, Moissy-Cramayel (FR); Anthony Cuffaro, Moissy-Cramayel (FR); Antoine Jacques Marie Pennacino, Moissy-Cramayel (FR); Jérémy David Seban, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/532,743

(22) Filed: Dec. 7, 2023

(65) Prior Publication Data
US 2024/0191793 A1 Jun. 13, 2024

(30) Foreign Application Priority Data

Dec. 9, 2022 (FR) ........................................ 2213102

(51) Int. Cl.
*F16H 57/04* (2010.01)
*F02C 7/06* (2006.01)
*F02C 7/36* (2006.01)

(52) U.S. Cl.
CPC ........... *F16H 57/0427* (2013.01); *F02C 7/06* (2013.01); *F02C 7/36* (2013.01); *F16H 57/0423* (2013.01); *F05D 2260/602* (2013.01); *F05D 2260/609* (2013.01); *F05D 2260/98* (2013.01)

(58) Field of Classification Search
CPC ........ F16N 19/00; F16N 2210/02; F02C 7/06; F01M 11/0004; F01M 2011/0037; F01M 2011/0033; F01M 2013/0422; F01M 11/067; F01D 25/18
See application file for complete search history.

(56) References Cited

U.S. PATENT DOCUMENTS

2019/0113127 A1 4/2019 Gravina

FOREIGN PATENT DOCUMENTS

EP 3575562 A1 12/2019

OTHER PUBLICATIONS

Search Report issued in French Application No. 2213102, issued May 24, 2023.

*Primary Examiner* — Anthony Ayala Delgado
(74) *Attorney, Agent, or Firm* — Bookoff McAndrews, PLLC

(57) ABSTRACT

A gutter for recovering lubrication oil, particularly for a mechanical reducer of an aircraft turbomachine, annular around a central axis, and comprising a first radial wall extending radially with respect to the central axis, an inclined wall extending from a radially outer end of the first radial wall, a guide portion having an overall U shape extending from one end of the inclined wall, and a second radial wall extending radially outward with respect to the central axis from one end of the guide portion, a space delimited by the first radial wall, the second radial wall and the inclined wall forming an oil intake chamber, and a space delimited by the guide portion and the second radial wall forming an oil evacuation cavity.

10 Claims, 3 Drawing Sheets

GUTTER FOR RECOVERING LUBRICATION OIL FOR A MECHANICAL REDUCER

CROSS-REFERENCE TO RELATED APPLICATIONS

This application claims benefit from French Patent Application 22 13102 filed on Dec. 9, 2022, its content being incorporated herein by reference.

TECHNICAL FIELD

The present disclosure relates to the field of mechanical reducers for aircraft turbomachines, such as planetary reducers among others. The present disclosure particularly relates to a gutter for recovering lubrication oil for such a reducer, and a power transmission device comprising such a mechanical reducer and such a gutter.

PRIOR ART

Mechanical reducers are currently used in mechanics, particularly in the field of aeronautics. Their role is to modify the speed and torque ratio between an input shaft and an output shaft of a mechanical system.

The new generations of multi-flow turbomachines, particularly those having a high expansion ratio, include a mechanical reducer to drive the shaft of a fan or of a propeller. Usually, the reducer is used to convert the so-called fast rotation speed of the shaft of a power turbine into a slower rotation speed for the shaft driving the fan.

Such a reducer conventionally comprises a central gear, the so-called "sun gear", an outer ring gear, and gears, so-called "planet gears" which are engaged between the sun gear and the outer ring gear. The planet gears are held by a body known as a planet carrier. The sun gear, the outer ring gear and the planet carrier are planetary members, since their axes of revolution coincide with the longitudinal axis of the turbomachine. On the other hand, the planet gears each have an axis of revolution different from the axis of revolution of the turbomachine, and distributed at regular intervals over the same operating diameter around the axis of the planetary wheels. These axes of the planet gears are parallel to the longitudinal axis of the turbomachine.

There are several architectures of mechanical reducer. The known mechanical reducers, used in bypass turbomachines, are of planetary or epicyclic type. There also exist, in other applications, so-called differential architectures. These different types of mechanical reducer can be distinguished as follows:

- On a planetary reducer, the planet carrier is fixed and the outer ring gear constitutes the output shaft of the device, which rotates in the reverse direction to the sun gear.
- On an epicyclic reducer, the outer gear is fixed and the planet carrier constitutes the output shaft of the device, which rotates in the same direction as the sun gear.
- On a differential reducer, no element is rotationally fixed. The outer ring gear rotates in the opposite direction to the sun gear and to the planet carrier.

In a planetary reducer in particular, the lubrication and cooling oil used to lubricate the different wheels of the reducer is generally evacuated by centrifugal force by way of radial channels formed in a flange of the outer ring gear. To prevent the oil from being sprayed outward and to limit losses, it is known to use oil-recovering gutters disposed around the flange of the outer ring gears, used to collect the oil sprayed by centrifugal force.

However, existing gutters do not make it possible to recover the oil satisfactorily. In particular, some gutters do not make it possible to retain the oil, which can then fall back onto the rotary parts of the reducer under gravity. Other gutters can partially retain the oil, but are not able to prevent a significant quantity of sprayed oil from bouncing off the walls of the gutter given the centrifugal force, and falling back onto the rotary parts. However, when the oil ducted by a gutter falls back onto a rotary part (the ring gear, the ring gear carrier, or the flange of the ring gear for example) it can cause non-negligible losses by transfer of momentum.

There is thus a need for a gutter making it possible to at least partly remedy the aforementioned drawbacks.

SUMMARY OF THE INVENTION

The present disclosure relates to a gutter for recovering lubrication oil, particularly for a mechanical reducer of an aircraft turbomachine, annular around a central axis, and comprising, in a section plane parallel to the central axis, a first radial wall extending radially with respect to the central axis, and at least one inclined wall extending from an outer radial end of the first radial wall, a guide portion having an overall U shape extending from an end of the inclined wall, and a second radial wall extending radially outward with respect to the central axis from an end of the guide portion, a space delimited by the first radial wall, the second radial wall and the inclined wall forming lubrication oil intake chamber, and a space delimited by the guide portion and the second radial wall forming a lubrication oil evacuation cavity.

In the present disclosure, the terms "radial", "axial" and their derivatives are considered along the central axis of the gutter, or else the main axis of rotation of the mechanical speed reducer described further on. Thus, a radial direction is a direction perpendicular to the central axis. Consequently, the first radial wall and the second radial wall extend radially, i.e. perpendicularly to the central axis. In other words, the first radial wall and the second radial wall are annular walls extending in a radial plane perpendicular to the central axis. The first and the second radial wall are therefore mutually parallel.

It will moreover be understood that the inclined wall is inclined with respect to the first radial wall from which it extends, and therefore this inclined wall is inclined with respect to the radial direction. The inclined wall therefore has a frustoconical shape that flares outward from the first radial wall.

Moreover, it will be understood that the guide portion extends at a first of its ends from the inclined wall, all the way to the second radial wall at a second of its ends. The U shape can in particular have two lateral walls and a curved bottom. It will thus be understood, according to these features, that the gutter has an overall G shape along the section plane parallel to the central axis.

Thus, the presence of the first and of the second radial wall, mutually parallel, form an input section making it possible to effectively recover, in the intake chamber, the lubrication oil sprayed when the recovering gutter is disposed around a mechanical reducer. Furthermore, the inclined wall makes it possible to divert the ejected oil toward the U-shaped guide portion, the latter then guiding the oil, given its shape, toward the bottom of the evacuation cavity formed between the guide portion and the second radial wall.

The configuration of the gutter for recovering lubrication oil according to the present disclosure, with an overall G or snail shell shape, thus makes it possible to improve the effectiveness of the recovery of the oil ejected by the mechanical reducer in operation, by avoiding the oil falling back onto the rotary parts of the reducer under gravity, and by limiting the quantity of oil bouncing off the walls of the gutter. It is thus possible to limit efficiency losses at the reducer by transfer of momentum of the oil.

In certain embodiments, the guide portion comprises a first axial wall extending parallel to the central axis from the end of the inclined wall, a curved wall forming a bottom of the U shape of the guide portion and extending from an end of the first axial wall, and a second axial wall extending parallel to the central axis from an end of the curved wall, the second radial wall extending from an end of the second axial wall.

It will be understood that the first axial wall and the second wall respectively constitute the two lateral walls of the U shape of the guide portion, these walls being each parallel to the central axis, and therefore mutually parallel. Moreover, the curved wall constitutes the bottom of the U connecting these two lateral walls. It will therefore be understood that when the lubrication oil is recovered in the intake chamber via the input section, then deflected by the inclined wall, it is guided toward the bottom of the evacuation cavity by the curved wall, the second axial wall constituting the bottom of said cavity.

In certain embodiments, a ratio of a distance F between an outer radial end of the second radial wall and the first axial wall, to a radial distance E between the outer radial end of the second radial wall and the second axial wall, is such that F/(E+F) is between 0.4 and 0.8.

It will be understood that the distance E+F represents the distance between the first and the second mutually parallel axial walls, in the radial direction. Furthermore, the distance E represents the height of the second radial wall up to which the oil can accumulate in the evacuation cavity. Moreover, the distance F represents the height of the oil passage section to the evacuation cavity, i.e. the section allowing the oil to pass from the intake chamber to the evacuation cavity, after being deflected by the inclined wall.

Thus, the greater the distance F, the greater the passage section between the intake chamber and the evacuation cavity. Similarly, the greater the distance E, the higher the second radial wall, and therefore the level of oil recovered and accumulated in the evacuation cavity. The values of the ratio of E to F thus make it possible to improve the recovery of the recovery oil, by maximizing the distance F making it possible to facilitate the intake of the oil in the evacuation cavity, while retaining a high enough height E to retain the largest quantity of oil possible.

In certain embodiments, in the section plane parallel to the central axis, an angle between the inclined wall and a radial direction perpendicular to the central axis is between 10° and 60°.

These values make it possible to improve the effectiveness of the diversion of the oil from the intake chamber toward the evacuation cavity, and therefore the effectiveness of the recovery of the lubrication oil by the gutter.

In certain embodiments, the inclined wall is a first inclined wall extending from the outer radial end of the first radial wall, the gutter comprising a second inclined wall extending between an end of the first inclined wall and the guide portion, an angle between the second inclined wall and a radial direction perpendicular to the central axis being greater than an angle between the first inclined wall and said radial direction.

It will be understood that the wall portion between the first radial wall and the first axial wall of the guide portion comprises two walls inclined differently to one another. More precisely, the first inclined wall is a frustoconical wall extending from the outer radial end of the first radial wall while flaring from said end, and forming a first angle with respect to the radial direction. Moreover, the second inclined wall is a frustoconical wall also, extending from the end of the first inclined wall while flaring from said end, and forming a second angle with respect to the radial direction, the second angle being greater than the first angle. In other words, the second inclined wall has a lower gradient with respect to the central axis than the first inclined wall.

The presence of these two walls, inclined differently to one another, makes it possible to further improve the effectiveness of the diversion of the lubrication oil. Specifically, when the gutter is disposed around a mechanical reducer to recover the sprayed lubrication oil from it, the shape of the gutter comprising two differently-inclined walls also takes into account the axial position at which an oil jet is ejected radially outward of the mechanical reducer toward the intake chamber, and in particular of the distance between the ejection point of the oil and the point at which it hits one or the other of the inclined walls.

The present disclosure also relates to a power transmission device for an aircraft turbomachine, comprising:
  a mechanical reducer comprising a central gear and an outer ring gear coaxial with one another around a main axis of rotation, and planet gears meshing with the central gear and the outer ring gear, the outer ring gear comprising two half-ring gears each having an outer annular flange attached to one another,
  at least a first radial oil ejection channel formed between the annular flanges and configured to eject lubrication oil by centrifugal force,
  a gutter as claimed in any of the preceding embodiments, radially disposed around the annular flanges, such that the intake chamber of the gutter is radially facing the first radial oil ejection channel.

Since the annular gutter is disposed around the outer ring gear, and particularly around the annular flanges, the central axis of the gutter and the main axis of rotation of the reducer are coaxial. It will moreover be understood that the outer annular flanges extend radially outward, i.e. in a direction perpendicular to the main axis of rotation, a radial plane comprising the joining interface between the annular flanges and being perpendicular to the main axis of rotation.

The first radial oil ejection channel can be a hole formed at the joining interface between the outer annular flanges of the outer ring gear, in a radial direction perpendicular to the main axis of rotation. Moreover, the mechanical speed reducer is preferably a planetary reducer, the outer ring gear then rotating about the central axis. Consequently, during the rotation of the outer ring gear, the lubrication oil circulating in the mechanical reducer can be evacuated radially outward by centrifugal force, by way of the first radial oil ejection channel, in the direction of the gutter, in particular toward the intake chamber disposed radially facing the first radial oil ejection channel.

In certain embodiments, the device comprises a plurality of first oil ejection channels contained in a first radial plane perpendicular to the main axis of rotation, the device comprising at least a second radial plane perpendicular to the main axis of rotation and comprising a plurality of second oil ejection channels, the at least one second radial plane being axially offset with respect to the first radial plane.

It will therefore be understood that the first radial plane is the plane comprising the joining interface between the outer annular flanges of the outer ring gear, the first radial plane comprising a plurality of first oil ejection channels circumferentially distributed around the main axis of rotation and each extending perpendicularly to said main axis of rotation. Moreover, the second radial plane can be a plane comprising a joining interface between one of the two outer annular flanges, and another part of the power transmission device, for example a rotor shaft. Thus, the power transmission device comprises two radial oil ejection planes disposed each facing the intake chamber of the gutter while being axially offset from one another in the direction of the main axis of rotation.

In certain embodiments, the first and the second radial plane are axially offset from one another such that a minimum axial distance between the first and the second radial wall of the gutter is at least 20% greater than an axial distance between the first and the second radial plane.

It is thus possible to maximize the quantity of oil recovered in the intake chamber by way of the input section between the first and the second radial wall, particularly when the oil ejection width is increased by the presence of at least two radial oil ejection planes.

In certain embodiments, a minimum axial distance between the first radial wall of the gutter and the radial plane located axially closest to the first radial wall is greater than or equal to 1 mm, and a minimum axial distance between the second radial wall of the gutter and the radial plane located axially closest to the second radial wall is greater than or equal to 1 mm.

It will be understood that the first radial plane, the second radial plane, the first radial wall and the second radial wall are all parallel to one another and perpendicular to the main axis of rotation. This minimum value of the distance between the first radial wall and the first radial plane (for example), and between the second radial wall and the second radial plane (for example) makes it possible to limit the risks the oil hitting said first and second radial walls due to the relative movements between the fixed part, for example a casing carrying the gutter, and the mechanical reducer. This consequently makes it possible to improve the effectiveness of the recovery of lubrication oil by the gutter. Note that this feature is also applicable to configurations in which the power transmission device comprises a single radial plane, or more than two radial oil ejection planes.

In certain embodiments, the device comprises a rotor shaft having a rotor flange attached to one of the annular flanges of the outer ring gear, the second radial oil ejection channels being formed between said annular flange and the rotor flange.

In other words, the joining interface between the rotor flange and one of the two annular flanges of the outer ring gear forms the second radial plane comprising the plurality of second radial oil ejection channels. The second radial oil ejection channels can be holes formed radially at the interface between the rotor flange and the outer annular flange of the outer ring gear, in a direction perpendicular to the main axis of rotation and being circumferentially distributed around the main axis of rotation. The rotor shaft can be the shaft mechanically connecting the outer ring gear to the fan.

In certain embodiments, the gutter comprises at least a first and a second inclined wall each disposed on the first and on the second radial plane respectively, the first inclined wall forming a first angle with the first radial plane, and the second inclined wall forming a second angle with the second radial plane, the first angle being smaller than the second angle when the first radial plane is further from the second radial wall than the second radial plane, and conversely.

It will be understood that the first inclined wall is disposed on the first radial plane, in that it is disposed radially facing said first radial plane, i.e. the same axial position as said first radial plane. Thus, the first radial plane passes through the first inclined wall, such that the oil ejected via the first radial oil ejection channels hits the first inclined wall. Similarly, it will be understood that the second inclined wall is disposed on the second radial plane, in that it is disposed radially facing said second radial plane, i.e. the same axial position as said second radial plane. Thus, the second radial plane passes through the second inclined wall, such that the oil ejected via the second radial oil ejection channels hits the second inclined wall.

According to this configuration, when the first radial plane is the furthest away from the second radial wall, a distance between the point of injection of the oil via the first radial oil ejection channels and the point at which the oil hits the first inclined wall, is less than a distance between the point of injection of the oil via the second radial oil ejection channels and the point at which the oil hits the second inclined wall, given the outward flared shape of the inclined walls. Consequently, the fact that the second inclined wall has a greater angle of inclination than the first inclined wall makes it possible to adapt the angle of incidence of the oil jets hitting the walls as a function of the axial position of the oil injection and therefore of the pressure of the jets, thus making it possible to thus improve the effectiveness of the diversion of the oil toward the evacuation cavity, and therefore the effectiveness of the recovery of oil by the gutter, in particular when the oil is ejected across over radial injection planes.

In certain embodiments, the device comprises three radial oil ejection planes axially offset from one another, a minimum axial distance between the first and the second radial wall of the gutter being at least 20% greater than an axial distance between the radial planes axially furthest from one another.

It will be understood that a first radial plane is formed between the outer annular flanges of the outer ring gear, a second radial plane is formed between one of said annular flanges and the rotor flange of the rotor shaft for example, and a third radial plane is formed between the other of said annular flanges and another rotary part of the power transmission device, for example a part used to duct the mechanical reducer. The three radial planes are axially offset with respect to one another, the first radial plane being then disposed between the second and the third radial plane. In this configuration, the minimum axial distance between the first and the second radial wall of the gutter is at least 20% greater than the axial distance between the second and the third radial plane.

The oil ejection width being further increased by the presence of three radial oil ejection planes, this feature thus makes it possible to maximize the quantity of oil recovered in the intake chamber by way of the input section between the first and the second radial wall.

In certain embodiments, a radial distance between a radially inner end of the gutter and a radially outer end of the annular flanges of the outer ring gear is greater than or equal to 1 mm.

In other words, the annular gutter is disposed entirely around the mechanical speed reducer, and radially outward of the annular flanges of the outer ring gear. The presence of a clearance greater than or equal to 1 mm between the gutter and the outer ring gear makes it possible to simplify the mounting of the gutter around the ring gear, and to limit the risks of contact between the gutter and the ring gear when the reductor is in operation.

In certain embodiments, the inclined wall is arranged such as to divert toward the evacuation cavity a radial oil jet ejected by the at least one first radial oil ejection channel.

The present disclosure also relates to an aircraft turbomachine comprising a power transmission device as claimed in any of the preceding embodiments.

BRIEF DESCRIPTION OF THE DRAWINGS

The invention and its advantages will be better understood on reading the detailed description given below of different embodiments of the invention given by way of non-limiting examples. This description refers to the appended pages of figures, wherein.

DESCRIPTION OF THE EMBODIMENTS

In the remainder of the description, the terms "radial", "axial", "inner", "outer" and their derivatives are considered with respect to the central axis X of the gutter 100 described hereinafter, or of the main axis of rotation Y of the mechanical reducer 10. Thus, a radial direction is perpendicular to the central axis X, and an axial direction is parallel to the central axis X. Similarly, a radial wall is perpendicular to the central axis X, and an axial wall is parallel to the central axis X.

Figure 1:
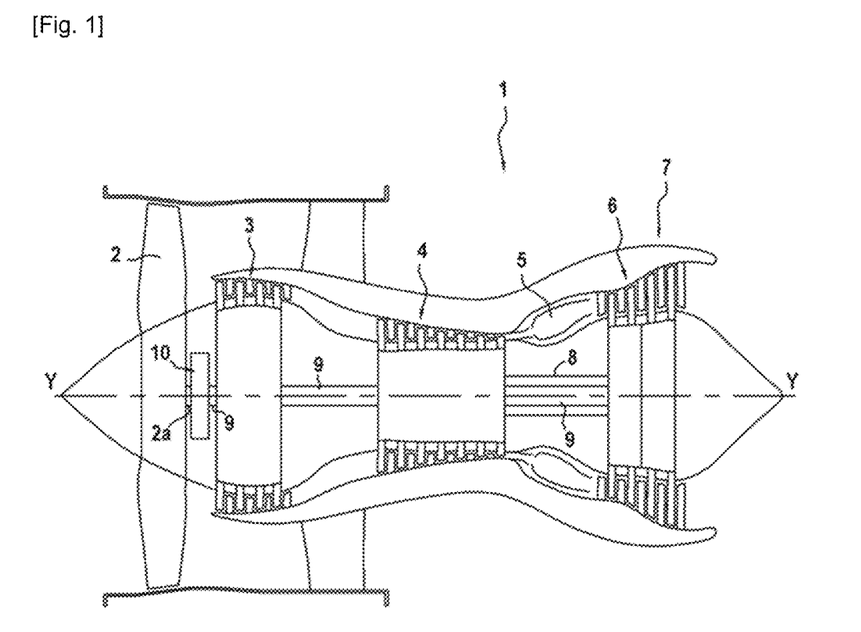
FIG. 1 is an axial section view of a turbomachine comprising a planetary reducer, FIG. 2 schematically represents a detail view of the turbomachine of FIG. 1, particularly of a power transmission device comprising the planetary reducer of FIG. 1, FIG. 3 schematically represents a detail view of a radially outer end of the planetary reducer of FIG. 2, FIG. 4 schematically represents a front view of an assembly comprising an oil-recovering gutter according to the invention, carried by a casing and disposed around the outer ring gear of the planetary reducer, FIG. 5 schematically represents a lateral view in a section plane B-B of the assembly of FIG. 4, FIG. 6 schematically represents a cross section of the gutter for recovering oil of the invention.

FIG. 1 shows, in section along a vertical plane passing through its main axis Y, an aircraft turbomachine, in particular a bypass turbojet engine with a reducer 1. It includes, from upstream to downstream along the circulation of the air stream, a fan 2, a low-pressure compressor 3, a high-pressure compressor 4, a combustion chamber 5, a high-pressure turbine 6, and a low-pressure turbine 7.

In such a reducer turbojet engine 1, the high-pressure turbine 6 drives the high-pressure compressor 4 using a high-pressure shaft 8. The low-pressure turbine 7, also known as the fast turbine, meanwhile drives the low-pressure compressor 3, also known as the fast compressor, using a low-pressure shaft 9. The fast turbine 7 also drives the rotor shaft 2a of the fan 2 by way of a mechanical speed reducer 10 (more simply known as "mechanical reducer 10" in the remainder of the description). In this way, the fan 2 can be driven at a low speed, which is favorable from the aerodynamic point of view, while the low-pressure compressor 3 can be driven at a greater speed, which is favorable from a thermodynamic point of view. The mechanical reducer can be a planetary mechanical reducer 10. Alternatively, the mechanical reducer can be an epicyclic gear reducer, or a differential reducer. Note moreover that the invention is applicable to mechanical reducers comprising single-unit planet or "cage and cage holder" type carriers.

Figure 2:
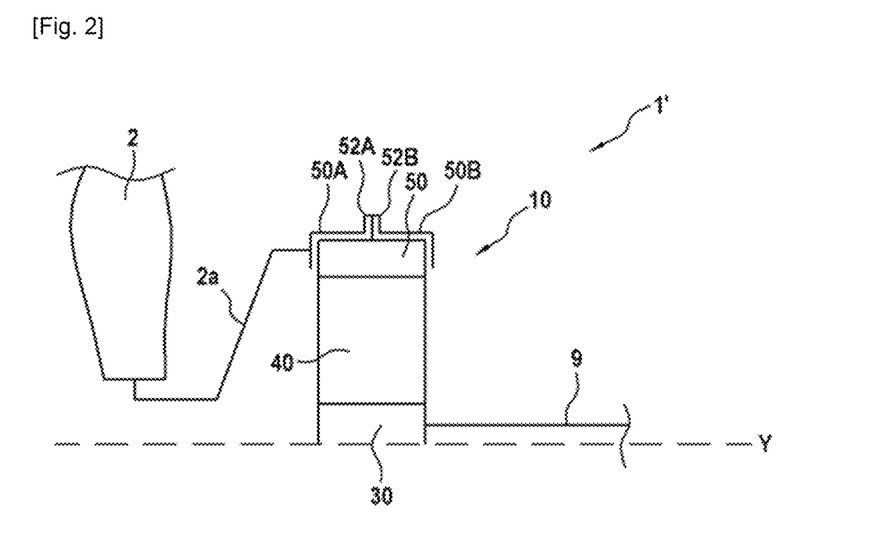
Figure 3:
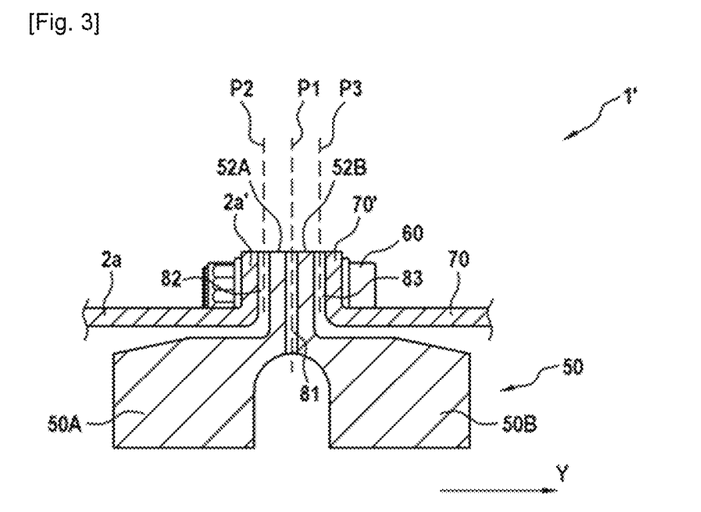

FIG. 2 shows, in section and along the same vertical plane passing through its main axis Y, a schematic detail view of the turbojet engine 1 of FIG. 1, and particularly of the power transmission device 1' comprising the mechanical reducer 10, and FIG. 3 shows a detail view of a radially outer end of the device 1' of FIG. 2.

The mechanical reducer 10 is a two-stage planetary gear box forming a gear box known by the acronym RGB (Reduction Gear Box). Certain parts, such as planet carriers or the casing surrounding the reducer, are masked to simplify the description. The mechanical reducer 10 comprises a sun gear 30, comprising a plurality of teeth on its radially outer face, and an outer ring gear 50 comprising a plurality of teeth on its radially inner face. The sun gear 30 and the outer ring gear 50 are coaxial and axisymmetric around the main axis of rotation Y. The mechanical reducer 10 further comprises planet gears 40, conventionally at least three, each being disposed between the sun gear 30 and the outer ring gear 50, while being in engagement with the latter gears, and each rotating about an axis of rotation substantially parallel to the main axis of rotation Y.

Conventionally, the outer ring gear 50 comprises two half-ring gears 50A, 50B, each comprising an outer annular flange 52A, 52B. The two half-ring gears 50A, 50B are assembled by way of the outer annular flanges 52A, 52B and axial attaching means such as screws and nuts 60.

Furthermore, the sun gear 30 is coupled to the low-pressure shaft 9, and the outer ring gear 50 is coupled to the fan 2 by way of the rotor shaft 2a. More specifically, the outer annular flange 52A of one of the two half-ring gears 50A is attached to a radial rotor flange 2a' of the rotor shaft 2a of the fan 2, by way of the attaching means 60.

Moreover, in this example, the outer annular flange 52B of the other of the two half-ring gears 50B is attached to a radial flange 70' of another rotary part 70, for example a part making it possible to duct the mechanical reducer 10.

In such a reducer 10, the lubrication oil which is used to lubricate and cool the different bearings and teeth of the reducer 10 is generally sprayed by centrifugal force through the outer ring gear 50. To facilitate the ejection of this oil, radial oil ejection channels are formed through the outer ring gear 50, particularly via radial oil ejection planes formed between the different radial flanges.

More precisely, in this example, a first radial plane P1 is formed by the joining interface between the outer annular flanges 52A, 52B of the half-ring gears 50A, 50B. First radial oil ejection channels 81 (only one is visible in FIG. 3) are formed in this first radial plane P1, and are circumferentially distributed around the main axis of rotation Y.

Similarly, a second radial plane P2 is formed by the joining interface between the outer annular flange 52A of one of the half-ring gears 50A and the rotor flange 2a' of the rotor shaft 2a. Second radial oil ejection channels 82 (only one is visible in FIG. 3) are formed in this second radial plane P2, and are circumferentially distributed around the main axis of rotation Y.

Finally, a third radial plane P3 is formed by the joining interface between the outer annular flange 52B of the other half-ring gear 50B and the radial flange 70' of the part 70. Third radial oil ejection channels 83 (only one is visible in FIG. 3) are formed in this third radial plane P3, and are circumferentially distributed around the main axis of rotation Y.

The radial oil ejection channels P1, P2, P3 are all three perpendicular to the main axis of rotation Y. They are moreover parallel with respect to one another and axially offset, along the main axis of rotation Y, with respect to one another.

After ejection of the lubrication oil radially outward via the radial oil ejection channels 81, 82, 83, the oil then trickles under gravity to the bottom of an enclosure formed by the casing 200 surrounding the reducer, where it can be pumped toward the reducer to be used again. This recovering method does however have drawbacks related to the absence of control of the oil spray.

To limit these drawbacks, an annular oil-recovering gutter 100 (more simply known as a gutter 100 in the remainder of the description) is disposed around the outer ring gear 50, and makes it possible to collect the oil sprayed by the radial oil ejection channels 81, 82, 83. The gutter 100 according to the invention is described with reference to FIGS. 4 to 6.

Figure 4:
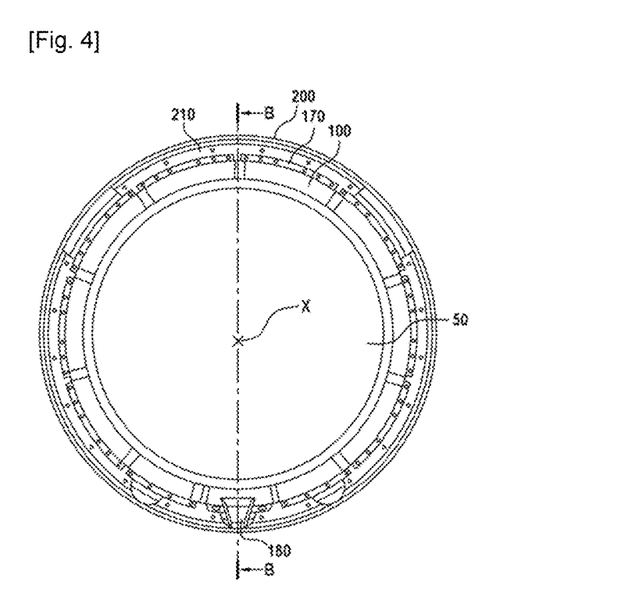
Figure 5:
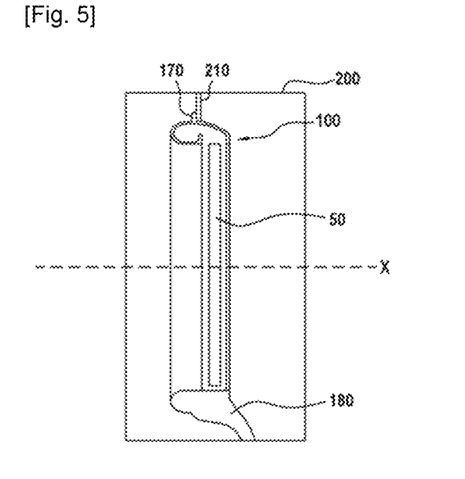

FIG. 4 schematically represents a front view, parallel to the central axis X of the gutter 100, of an assembly comprising the outer ring gear 50, the gutter 100 and a fixed casing 200 of the turbojet engine 1, carrying the gutter 100. Moreover, FIG. 5 schematically represents a lateral section view of this assembly, perpendicularly to the central axis X, in a section plane B-B of the assembly of FIG. 4. Note that when the gutter 100 is disposed in the turbojet engine 1, particularly in the power transmission device 1' around the outer ring gear 50, the central axis X of the gutter 100 is coaxial and collinear with the main axis of rotation Y of the reducer 10, in other words of the turbojet engine 1.

The gutter 100 comprises, over its radially outer periphery, an annular flange 170 attached to an annular flange 210 of the casing 200, disposed along a radially inner face of said casing 200. Thus, the gutter 100 attached to the fixed casing 200 is itself fixed and immovable with respect to the casing 200 of the turbojet engine 1.

Furthermore, the gutter 100 comprises, in its lower part, an evacuation duct 180. The oil stored and accumulated in the evacuation cavity 160 described hereinafter can thus drain along it under gravity all the way to this evacuation duct by which it can be evacuated toward the outside of the mechanical reducer 10 without falling back on the various bearings thereof, and where applicable be reused to lubricate these bearings again.

Moreover, the gutter 100 is radially disposed around the outer ring gear 50, such that the outer annular flanges 52A, 52B are disposed radially facing an input section of the gutter 100 used to recover the oil ejected by way of the radial oil ejection channels 81, 82, 83.

Figure 6:
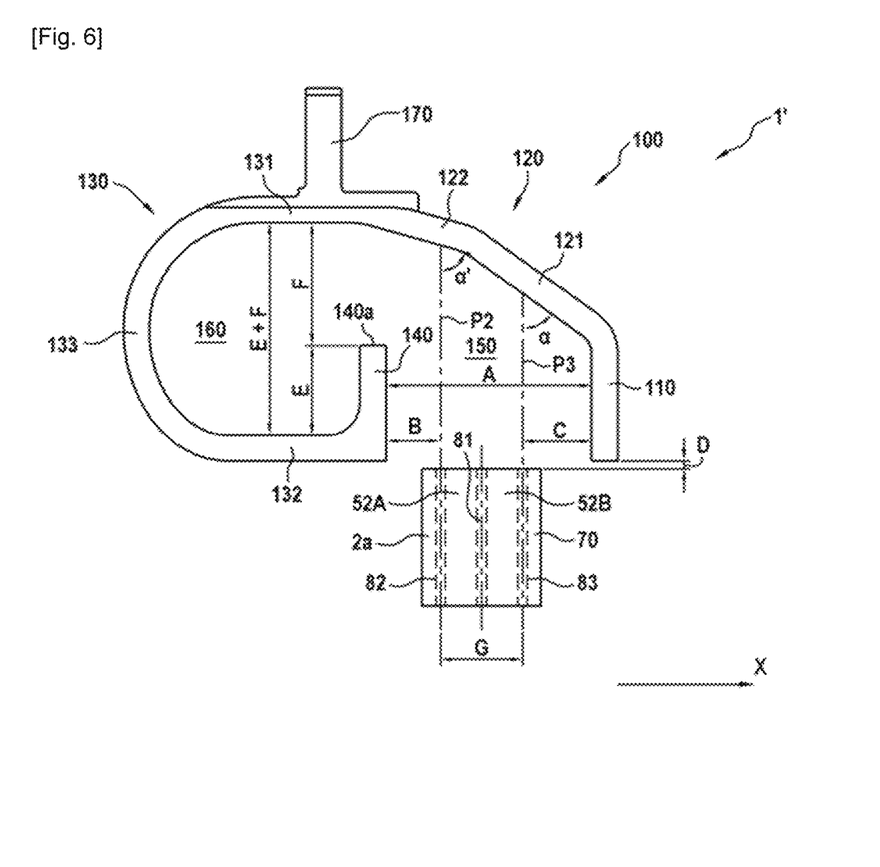

In this regard, the gutter 100 according to the invention has a particularly advantageous shape, illustrated in more detail in FIG. 6, showing a cross section, perpendicular to an azimuthal direction, of the gutter 100 disposed facing a radially outer end of the outer ring gear 50, particularly of the outer annular flanges 52A, 52B thereof. Note that to simplify the description hereinafter, focused on the structure and the geometry of the gutter 100, certain elements such as the casing 200 or the lower part of the outer ring gear 50 are deliberately masked in FIG. 6. In fact, apart from the gutter 100, only the radial ends of the radial flanges 52A, 52B, 2a', 70' of the outer ring gear 50, of the rotor shaft 2a and of the rotary part 70, are shown.

The term "radially facing" should be understood to mean that the outer annular flanges 52A, 52B, in particular the radial channels 81, 82, 83 and the radial oil ejection planes P1, P2, P3, are disposed at the same axial position along the central axis X as the input section of the gutter 100, and particularly its intake chamber 150 described hereinafter, in such a way as to recover the oil ejected by said radial oil ejection channels 81, 82, 83.

Moreover, the gutter 100 has, along this section, the overall shape of a G or else of a snail. It particularly comprises a first radial wall 110, of annular shape around the central axis X. An inclined wall 120, of frustoconical shape, extends from a radially outer end of the first radial wall 110, a radially inner wall of the first radial wall 110 being a free end.

Moreover, a guide portion 130 extends from a radially outer end of the inclined wall 120. The guide portion 130 has, along this section of the gutter 100, an overall U shape. In particular, the guide portion 130 comprises a first axial wall 131 extending from the radially outer end of the inclined wall 120 in a direction moving away from the first radial wall 110, a curved wall 133 extending from one axial end of the first axial wall 131, this portion of the gutter then making a U-turn such as to return toward the first radial wall 110, and a second axial wall 132 extending from the other end of the curved wall 133 in the direction of the first radial wall 110.

The gutter 100 finally comprises a second radial wall 140 extending radially outward from one axial end of the second axial wall 132, of annular shape around the central axis X. The first radial wall 110 and the second axial wall 140 are mutually parallel and perpendicular to the central axis X. They are each disposed axially on either side of the assembly formed by the assembly of the radial flanges 52A, 52B, 2a' and 70', while being spaced axially apart from one another by a distance A.

The distance A is such that it is greater than or equal to 20% of a distance G, which is the axial distance between the two radial oil ejection planes axially furthest from one another, in this example the second radial plane P2 and the third radial plane P3. Moreover, an axial distance B, which is the axial distance between the second radial plane 140 and the radial oil ejection plane closest to it, here the second radial plane P2, and an axial distance C, which is the axial distance between the first radial wall 110 and the radial oil ejection plane closest to it, here the third radial plane P3, are such that B and C are each greater than or equal to 1 mm.

Note moreover that a distance D between the radially outer end of the assembly formed by the assembly of the radial flanges 52A, 52B, 2a' and 70', and the radially inner end of the gutter 100, particularly of the first radial wall 110 and of the second radial wall 140, is non-zero. In other words, the gutter 100 is disposed entirely radially outward of the outer ring gear 50.

Thus, the first and second radial walls 110, 140 form the input section of the gutter 100, through which passes the oil ejected by the radial oil ejection channels 81, 82, 83, and making it possible to effectively recover this oil.

In particular, the first radial wall 110, the inclined wall 120, and a first face of the second radial wall 140, delimit an intake chamber 150, into which is taken the oil ejected by the radial oil ejection channels 81, 82, 83. Furthermore, the guide portion 130 and a second face, opposite the first face, of the second radial wall 140, delimit a lubrication oil evacuation cavity 160, into which the oil coming from the intake chamber 150 is transferred and can accumulate. In particular, the oil ejected and sprayed by the radial oil ejection channels, 81, 82, 83 then hits the inclined wall 120. Due to the inclination thereof, the oil hitting the inclined wall 120 is deflected toward the evacuation cavity 160. The oil is then guided by the U-shaped guide portion 130, particularly by the curved wall 133, toward the bottom of said evacuation cavity 160.

In particular, the second radial wall 140 forms a lateral wall of a reservoir used to accumulate oil, the second axial wall 132 forming the bottom of this reservoir. In this regard, a radial distance E is a radial distance between the radially outer end 140*a* of the second radial wall 140, and the second axial wall 132. The distance E is in fact equivalent to the height of the second radial wall 140 used to retain the oil in the evacuation cavity 160. Moreover, a radial distance F is a radial distance between the radially outer end 140*a* of the second radial wall 140, and the first axial wall 131. The distance F is in fact equivalent to the height of the opening allowing the oil to pass from the intake chamber 150 to the evacuation cavity 160, after diversion by the inclined wall 120. Thus, the radial distance E+F corresponds to the radial distance between the first axial wall 131 and the second axial wall 132, these walls being mutually parallel. Moreover, a ratio of the distance E to the distance F is such that $F/(E+F)$ is between 0.4 and 0.8.

Moreover, given the flared and frustoconical shape of the inclined wall 120, the radial distance between the oil injection point at the radially outer end of the third radial oil ejection channels 83 and the inclined wall 120, and less than the radial distance between the oil injection point at the radially outer end of the second radial oil ejection channels 82 and the inclined wall 120.

Consequently, in order to facilitate the diversion of the oil toward the evacuation cavity 160, the inclined wall 120 is formed in two parts. A first inclined wall 121 extends from the radially outer end of the first radial wall 110, while radially flaring outward. The first inclined wall 121 forms a first angle α with respect to the first radial wall 110, or else with respect to the radial oil ejection planes P1, P2, P3. A second inclined wall 122 extends from a radially outer end of the first inclined wall 121, while radially flaring outward. The second inclined wall 122 forms a second angle α' with respect to the first radial wall 110, or else with respect to the radial oil ejection planes P1, P2, P3, the second angle α' being greater than the first angle α. The first axial wall 131 of the guide portion 130 extends from the radially outer end of the second inclined wall 122.

In this example, the second radial plane P2 passes through the second inclined wall 122, and the third radial plane P3 passes through the first inclined wall 121. In other words, the lubrication oil ejected by the second radial oil ejection channels 82 hits the second inclined wall 122, and the lubrication oil ejected by the third radial oil ejection channels 83 hits the first inclined wall 121.

Note that this example is not limiting, since the inclined wall 180 could comprise three inclined walls each forming a different angle and each corresponding to one of the three radial planes P1, P2, P3.

Although this invention has been described with reference to specific examples, it is obvious that modifications and changes can be made to these examples without departing from the general scope of the invention as defined by the claims. In particular, individual features of the different embodiments illustrated/mentioned can be combined in additional embodiments. Consequently, the description and drawings must be considered in an illustrative sense rather than a restrictive one.

The invention claimed is:

1. A power transmission device for an aircraft turbomachine, comprising:

a mechanical reducer comprising a central gear and an outer ring gear coaxial with one another around a main axis of rotation, and planet gears meshing with the central gear and the outer ring gear, the outer ring gear comprising two half-ring gears each having an outer annular flange attached to one another, a plurality of first oil ejection channels contained in a first radial plane perpendicular to the main axis of rotation, formed between the annular flanges and configured to eject lubrication oil by centrifugal force, a gutter for recovering lubrication oil, annular around a central axis, and comprising, in a section plane parallel to the central axis, a first radial wall extending radially with respect to the central axis, at least a first and a second wall inclined with respect to the first radial wall and extending from an outer radial end of the first radial wall, a guide portion having an overall U-shape extending from an end of the inclined wall, and a second radial wall extending radially outward with respect to the central axis from an end of the guide portion, a space delimited by the first radial wall, the second radial wall and the inclined walls forming a lubrication oil intake chamber, and a space delimited by the guide portion and the second radial wall forming a lubrication oil evacuation cavity, the gutter being radially disposed around the annular flanges, such that the intake chamber of the gutter is radially facing the first oil ejection channels, the device comprising at least a second radial plane perpendicular to the main axis of rotation and comprising a plurality of second oil ejection channels, the at least one second radial plane being axially offset with respect to the first radial plane, wherein the first and the second inclined wall are each disposed on the first and on the second radial plane respectively, the first inclined wall forming a first angle with the first radial plane, and the second inclined wall forming a second angle with the second radial plane, the first angle being smaller than the second angle when the first radial plane is further from the second radial wall than the second radial plane, and conversely.

2. The device as claimed in claim 1, wherein the guide portion comprises a first axial wall extending parallel to the central axis from the end of the inclined wall, a curved wall forming a bottom of the U shape of the guide portion and extending from an end of the first axial wall, and a second axial wall extending parallel to the central axis from an end of the curved wall, the second radial wall extending from an end of the second axial wall.

3. The device as claimed in claim 2, wherein a ratio of a radial distance E between an outer radial end of the second radial wall and the second axial wall, to a distance F between the outer radial end of the second radial wall and the first axial wall, being such that $F/(E+F)$ is between 0.4 and 0.8.

4. The device as claimed in claim 1, wherein, in the section plane parallel to the central axis, the angles between the inclined walls and a radial direction perpendicular to the central axis is between 10° and 60°.

5. The device as claimed in claim 1, wherein the first and the second radial plane are axially offset from one another such that a minimum axial distance between the first and the second radial wall of the gutter is at least 20% greater than an axial distance between the first and the second radial plane.

6. The device as claimed in claim 1, wherein a minimum axial distance between the first radial wall of the gutter and the radial plane located axially closest to the first radial wall is greater than or equal to 1 mm, and a minimum axial distance between the second radial wall of the gutter and the radial plane located axially closest to the second radial wall is greater than or equal to 1 mm.

7. The device as claimed in claim 1, comprising a rotor shaft having a rotor flange attached to one of the annular flanges of the outer ring gear, the second radial oil ejection channels being formed between said annular flange and the rotor flange.

8. The device as claimed in claim 1, comprising three radial oil ejection planes axially offset from one another, a minimum axial distance between the first and the second radial wall of the gutter being at least 20% greater than an axial distance between the radial planes axially furthest from one another.

9. The device as claimed in claim 1, wherein a radial distance between a radially inner end of the gutter and a radially outer end of the annular flanges of the outer ring gear is greater than or equal to 1 mm.

10. The device as claimed in claim 1, wherein the inclined walls are arranged such as to divert toward the evacuation cavity a radial oil jet ejected by the radial oil ejection channels.

* * * * *